INVENTORS
KENNETH E. REYNOLDS
ROBERT C. KUSTER
BY
ATTORNEYS

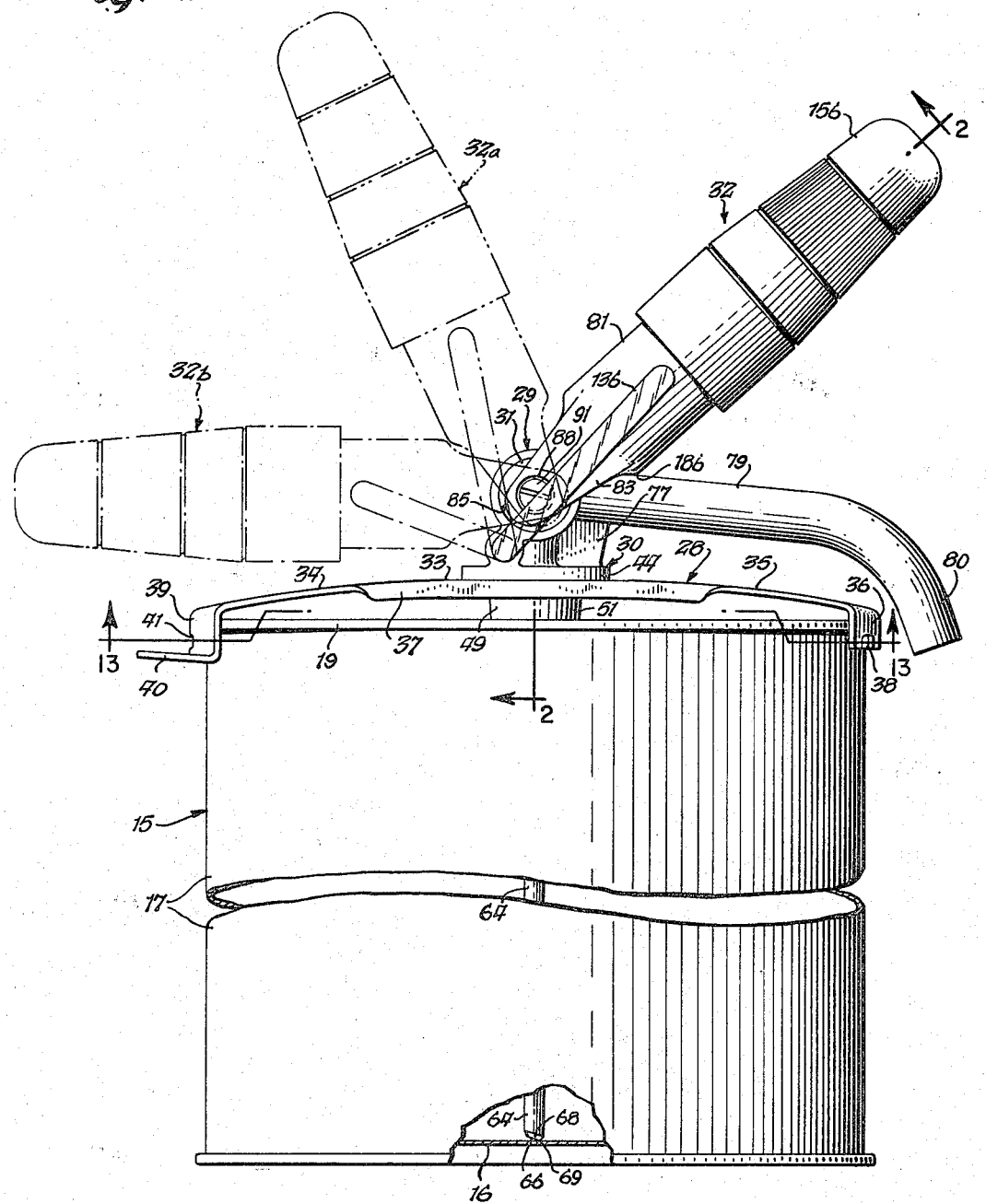

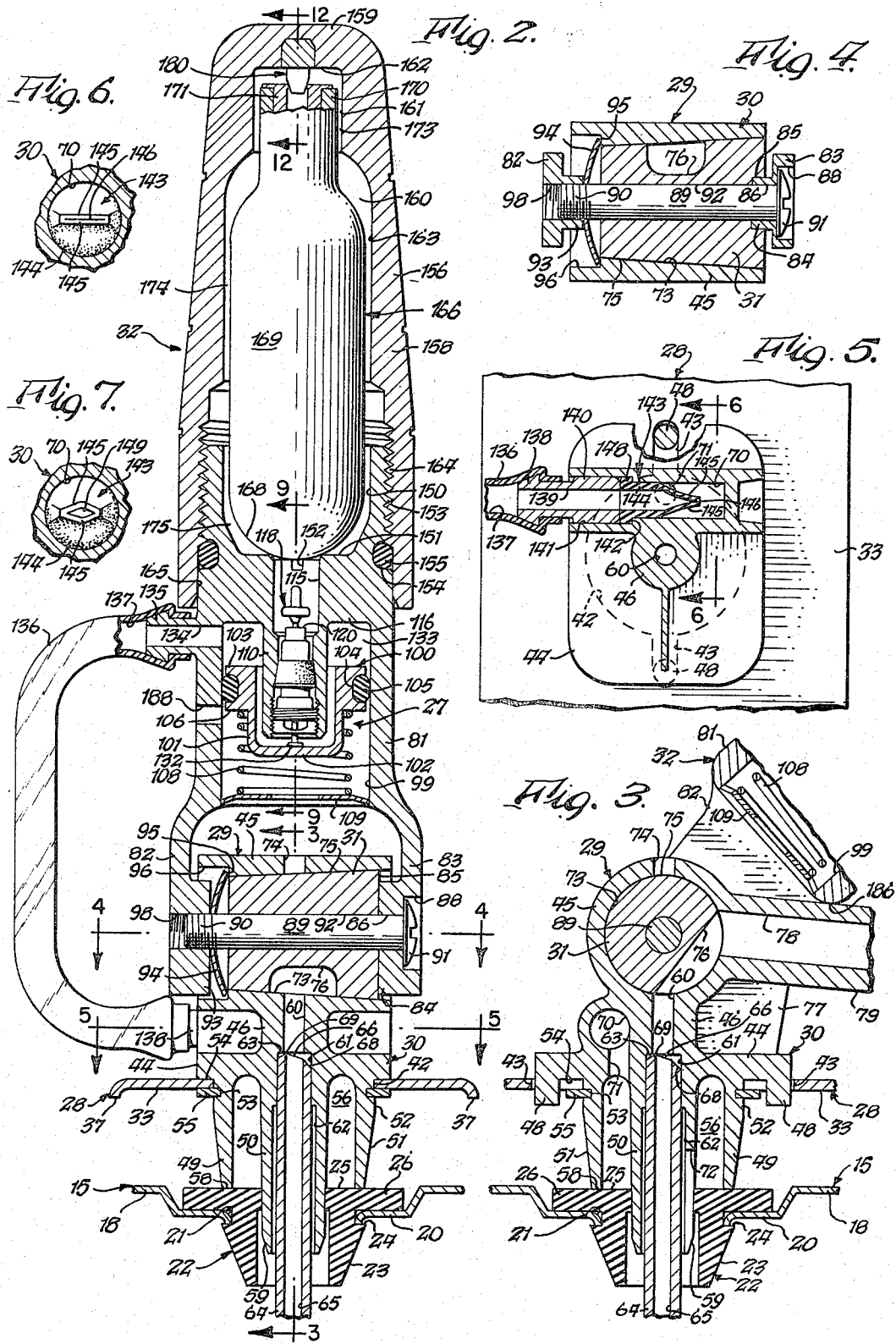

June 27, 1967 K. E. REYNOLDS ET AL 3,327,899
BEVERAGE DISPENSING APPARATUS
Filed Sept. 13, 1965 4 Sheets-Sheet 4

INVENTORS
KENNETH E. REYNOLDS
ROBERT C. KUSTER
BY Popp and Sommer
ATTORNEYS

United States Patent Office 3,327,899
Patented June 27, 1967

3,327,899
BEVERAGE DISPENSING APPARATUS
Kenneth E. Reynolds, Alden, and Robert C. Kuster, Holland, N.Y., assignors to Conax Corporation, Buffalo, N.Y., a corporation of New York
Filed Sept. 13, 1965, Ser. No. 486,985
14 Claims. (Cl. 222—5)

This invention relates to improvements in beverage dispensing apparatus, and more particularly to such apparatus for dispensing carbonated beverages such as beer.

It has recently become popular to sell draught beer in cylindrical metal cans of one gallon capacity. Draught beer is unpasteurized beer having a distinctive flavor but requires constant refrigeration, as compared to unpasteurized beer. Such gallon cans have been provided with a bung or suitable closure for a hole provided centrally in the top wall of the can.

While attempts have been made previously to provide apparatus mountable on such a can for dispensing the liquid contents thereof, they have not met with success. One outstanding failure of one prior device was that it sought to maintain a pressure within the can to motivate liquid flow of manipulating an air pump. The injected air was not only incompatible with the carbonated beer within the can causing a deterioration of flavor but no means were provided for regulating the pressure produced in the cans so that it was either too high causing wildness or excessive foaming of the beer or insufficient.

Accordingly, the primary purpose of the present invention is to provide dispensing apparatus which may be mounted on such a can of beer and selectively operated to discharge beer while at all times subjecting the beer to a suitable predetermined and regulated pressure with carbon dioxide gas thus providing compatibility between the liquid beer in the bottom of the can and the gaseous atmosphere above the liquid in the top of the can.

Other and important objects of the invention are to provide dispensing apparatus having the following features and advantages:

(a) Employs a cartridge or metal bottle of highly pressurized carbon dioxide arranged in an inconspicuous location and so disposed that the carbon dioxide which may be liquid at least initially cannot run out of the cartridge after the same is punctured;

(b) Punctures the carbon dioxide cartridge to provide an effective discharge opening therein for the carbon dioxide;

(c) Provides a pressure regulator which is compact in design and which is also arranged in an inconspicuous location;

(d) Employs in such pressure regulator a small, readily available and commercial valve assembly such as is used with pneumatic tires for vehicles;

(e) Provides safety means for venting any excessively high pressure which may be passed by the pressure regulator should the same malfunction so that the container on which the dispensing apparatus is mounted cannot burst;

(f) Provides a discharge of beer at such a pressure and flow rate that glass can be filled in a convenient length of time and a desired amount of head is formed on the beer in the glass;

(g) Is easily mounted on a can and without leakage of beer from the can whereby no mess is created;

(h) Prevents beer from entering the carbon dioxide pressure regulator and this prevents fouling its mechanism;

(i) Includes a handle selectively manipulatable to control the discharge of beer at maximum rate and without turbulence which otherwise would cause excessive foaming;

(j) The can with dispensing apparatus mounted thereon may be conveniently stored in a household refrigerator;

(k) Is easy to clean after use on one can to prepare it for use on another can;

(l) Is easy to replace a spent carbon dioxide cartridge with a fresh one;

(m) In general is simple in construction, easy to manufacture, attractive, relatively inexpensive, reliable and not likely to get out of order or to require repairs.

Still other objects and advantages will be apparent from the following detailed description of embodiments of the invention taken in conjunction with the accompanying drawings wherein:

FIG. 1 is a side elevational view of dispensing apparatus embodying the present invention and showing the same mounted on a metal can, an intermediate portion of the can being broken away to reduce the height of the figure.

FIG. 2 is an enlarged fragmentary substantially vertical sectional view of the inventive dispensing apparatus and taken on line 2—2 of FIG. 1.

FIG. 3 is a fragmentary sectional view thereof showing the beverage flow control valve fully open and taken on line 3—3 of FIG. 2.

FIG. 4 is a horizontal sectional view thereof taken on line 4—4 of FIG. 2.

FIG. 5 is a horizontal sectional view thereof taken on line 5—5 of FIG. 2.

FIG. 6 is a fragmentary vertical sectional view showing the end of the check valve in closed position and taken on line 6—6 of FIG. 5.

FIG. 7 is a view similar to FIG. 6 but showing the check valve in an open condition.

Figure 8:
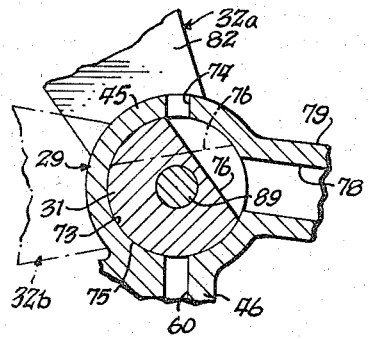
FIG. 8 is a fragmentary sectional view similar to FIG. 3 but showing the flow control valve in a shut-off position.

Referring to FIG. 1, the numeral 15 represents generally a gallon can containing a carbonated beverage such as beer and having a bottom wall 16, a cylindrical side wall 17 and an upper wall 18 (FIG. 2). The bottom and top walls are crimped in the well known manner to the side wall so as to provide an outwardly extending annular flange or bead such as indicated at 19 for the upper wall.

Referring to FIG. 2, the top wall 18 is shown as having a central downwardly offset or recessed cylindrical portion 20 through which a vertical hole 21 extends. In FIG. 2 this hole 21 is shown as closed by a plug or bung 22 made of elastomeric material. This bung is shown as being in the form of an inverted cup-shaped member having an externally tapered side wall surface 23 at the upper end of which is provided an annular groove 24 which receives the rim portion of the recessed top wall 20 surrounding the hole 21. The bung also includes a top wall portion 25 which is disk-shaped in plan and includes an outwardly extending annular flange portion 26 which overlaps the recessed wall portion 20 of the can.

When the can is purchased filled with beer the top wall 25 of the bung is imperforate and seals the beer within the can including the vapor pressure normally developed above the level of beer in the can. The normal head or vapor pressure at 38° F. is 10–12 pounds per square inch. This is the approximate temperature at which a household refrigerator is maintained and in which the can of beer with or without the dispensing apparatus mounted thereon should be stored.

Referring to the dispensing apparatus itself, the same is shown as comprising a mounting plate 28, beverage flow control valve means 29 including a body member 30 housing a rotatable valve member or plug 31, and a hollow handle 32 for moving valve 31 and housing a pressure regulator 33, these numerals being for general reference.

Referring to FIG. 1, the full line presentation of the handle 32 depicts its position when the valve 29 is fully open for maximum discharge of beer. The position of this handle represented by broken lines at 32a in FIG. 1 depicts the position of the handle when the valve 29 is fully shut off. The position 32b represented by broken lines in FIG. 1 depicts the position of the handle for storage to reduce the overall height of the can with the dispensing apparatus mounted thereon so that it may be convenient for storage on a shelf in a household refrigerator.

Figure 13:
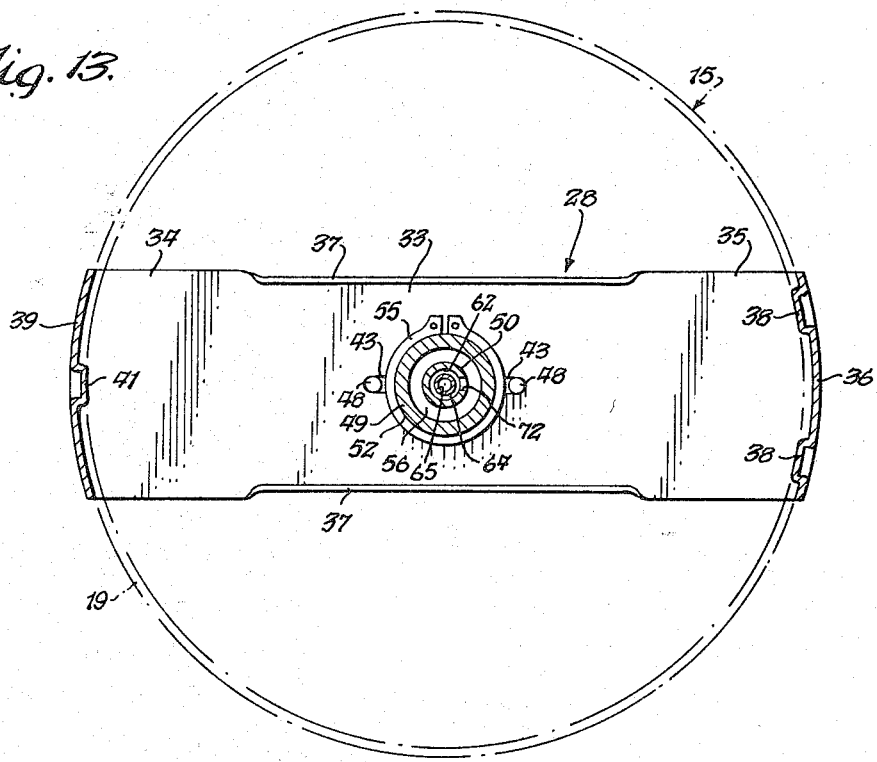
FIG. 13 is a horizontal sectional view of the dispensing apparatus and taken on line 13—13 of FIG. 1.

Considering first the mounting of the dispensing apparatus on the can, the plate 28 is shown as having a flat central horizontal portion 33 from which two intermediate portions 34 and 35 extend from opposite ends thereof, these portions 34 and 35 severally inclining slightly downwardly away from the central portion. At its outer end intermediate portion 35 has a downturned end portion 36 which is curved in plan (FIG. 13) at a radius so as to be concentric with the can rim 19 and embrace the same. This downturned flange portion 36 is shown as having a pair of inwardly extending and circumferentially spaced lugs 38 which are struck out from the body of portion 36. The upper surface of these lugs 38 engages the under surface of the can bead or flange 19 so as to interlock therewith.

On its diametrically opposite side the mounting plate 28 at the outer end of intermediate portion 34 also includes a downturned flange portion 39 but the extremity of this is outwardly turned to provide a handle portion 40. Downturned portion 39 is shown as having a single centrally disposed inwardly extending lug 41 which is also struck out from the body of flange portion 39. The upper edge of this lug 41 interlocks with the under surface of can flange or bead 19. The plate 28 for a portion of its length between its end flanges 36 and 39 is shown as having downturned edge portions 37, 37, these serving as reinforcing flanges to improve the rigidity of the plate 28.

The central portion 33 of mounting plate 28 is shown as provided with a circular vertical hole 42 having a pair of diametrically opposed recesses 43, 43. This hole 42 receives a portion of the valve body 30 which is secured to the plate 28 in a manner now to be described.

Valve body member 30 is shown as comprising an intermediate plate portion 44 above which is arranged a sleeve portion 45 for accommodating movable valve or plug 31. This sleeve portion 45 is supported from plate portion 44 by an integral neck portion 46. Depending from opposite ends of plate portion 44 which is generally rectangular in plan as shown in FIG. 5 are a pair of integral lugs 48, 48 severally received in notches 43. Centrally depending from plate portion 44 is an integral outer annular part 49 and an integral inner annular part 50. The external surface of outer part 49 is tapered as indicated at 51, the narrow end of such taper being remote from plate portion 44. Outer part 49 includes a short cylindrical part 52 immediately adjacent the plate portion 44 and above the large end of the tapered surface 51.

This cylindrical portion is provided with an external annular groove 53. The upper side wall of this groove is spaced from the lower surface 54 of plate portion 44 by a distance corresponding to the thickness of the central flat portion 43 of mounting plate 28. Groove 53 is shown as receiving partially a split retaining ring 55. A portion of this ring 55 is exposed and opposes the bottom surface of plate 28.

When mounting body member 30 on plate 28, the part 49 is passed through hole 42 in the plate and alined so that lugs 48 can enter notches 43. This maintains the orientation of the valve body member relative to the plate. Following this, the split ring 55 is forced over part 49. As it is pushed toward the plate 28 the inner surface of the ring engages tapered surface 51 and is cammed thereby so as to progressively enlarge until it can be slipped over cylindrical part 52. Continued upward movement of ring 55 will cause it to be positioned opposite groove 53 whereupon this ring snaps into this groove and is thereby locked to the valve body member and also retains the same on plate 28.

The outer part 49 is radially spaced from and shorter in length than the inner part 50 so as to provide an annular space 56, the outer part 49 having a lower end face 58. This end face 58 presses against the upper surface of top wall 25 of bung 22. This seals the contact between this end face 58 and the bung and also between the bung and the upper surface of the recessed wall portion 20 of the can. Inner part 50 is shown as extending through top wall 25 of bung 22. The lower end of this inner part 50 is shown as being externally bevelled as indicated at 59 for a purpose hereinafter explained.

This inner part 50 is shown as having an internal vertical bore which extends upwardly through body neck 46, this bore being stepped and including an upper section 60, an intermediate section 61 of slightly larger diameter and a lower section 62 of still larger diameter. The step between sections 60 and 61 provide a downwardly facing annular shoulder 63. Press fitted into bore portion 61 is the upper end of a beer withdrawal tube 64. This tube has a cylindrical exterior and a cylindrical bore 65 the diameter of which should fall within the range of from 0.080 to 0.125 inch for a reason explained later herein. The outside diameter of this tube 64 is such that it can be conventionally press fitted into intermediate bore portion 61 by hand.

As shown in FIGS. 1 and 2, opposite ends of tube 64 are cut off at an angle as indicated at 66 with the wall portion bevelled as indicated at 68 to provide a salient knife edge 69. The inside diameter of tube bore 65 is slightly less than that of the upper bore portion 60. By having opposite ends of tube 64 formed the same, either end can be inserted into the valve body member 30. Tube 64 has a length such that when mounted on the valve body member the lower end of this tube is immediately adjacent the top of bottom can wall 16 as shown in FIG. 1. Also the lower tube edge 66 being inclined to the surface of bottom can wall 16 allows substantially complete emptying of the can.

Referring to FIG. 3, annular space 56 is shown as communicating with a horizontal recess 70 by a vertical passage 71, both this recess and passage being provided in body member 30. Pressure regulated carbon dioxide is admitted to this recess 70, in a manner explained later herein, and is adapted to pass the top wall 25 of bung 22 by flowing through a slot 72 provided in inner part 50, this slot extending at its top from a location above the upper surface of bung 22 to the lower extremity of inner part 50.

Upper bore portion 60 is shown as opening into a frustoconical chamber formed by the correspondingly shaped inside wall surface 73 of sleeve portion 45 of body member 30. A vent hole 74 extends through the top of the sleeve 45 so as to place this chamber in communication with atmosphere.

Valve member 31 is in the form of a plug having an external frusto-conical surface 75 corresponding to surface 73 and rotatably engageable therewith. This valve member 31 is provided with a chordal groove 76 and is adapted to establish communication between the upper end of bore portion 60 which serves as an inlet to the valve chamber and the inner end of the bore or passage 78 of a spout 79 which is integrally formed with body member 30. Spout 79 is inclined slightly downwardly away from its inner end which forms an outlet for the valve chamber toward a further downwardly turned discharge end indicated at 80 arranged laterally outwardly of end portion 36 of mounting plate 28 (FIG. 1). An integral gusset 77 forming part of body member 30 is arranged between the inner end of spout 79 and plate portion 44.

Valve member 31 is caused to be rotated about the common horizontal axis of frusto-conical surfaces 73 and 75 by the handle 32. Referring to FIG. 2, this handle 32 is shown as including an inner part 81 having at its end adjacent the pivotal axis for the valve a pair of integral downwardly extending and laterally spaced arms 82 and 83. Arm 83 is shown as having an integral flat sided lug 84 on its inner side adapted to be received in a slot 85 of similar shape provided in the large end of valve member 31. This lug 84 and the adjacent arm portion 83 are shown as provided with a transverse horizontal bore 86 the outer end portion of which is enlarged as indicated at 88. Through this bore 86 extends the shank of a screw 89 having external threads 90 at one end and an enlarged head 91 at its opposite end accommodated in counter bore 88. The screw shank extends through a cylindrical bore 92 provided horizontally through valve member 31.

The other arm 82 is shown as provided with an integral boss 93 on its inner side the inner end face of which is adapted to abut the salient central portion of a dished spring washer 94. The rim of this washer 94 is shown as engaging an axially facing shoulder 95 provided by an enlarged cylindrical bore portion 96 at the narrow end of frusto-conical surface 73. The lugs 93 and adjacent part of arm 82 are provided with an internally threaded hole 98 adapted to receive the threaded end 90 of screw 89.

By this arrangement it will be seen that tightening screw 89 loads spring washer 94 and causes intimate contact between frusto-conical surfaces 73 and 75, this contact being sufficient to provide a seal along opposite sides of groove 76 in all positions of valve member 31.

The pressure regulator 32 and its association with recess 70 in the valve body member 30 will now be described.

The portion of inner handle part 81 immediately above arms 82 and 83 is shown as provided with a recess formed by a cylindrical internal wall surface 99. This surface 99 forms a cylinder wall on which a piston member indicated generally at 100 is slideable. This piston member is of generally cup-shaped configuration including an annular side wall 101, a closed end wall 102 at the lower end of the side wall and an outwardly extending annular flange portion 103 at the upper end of the side wall. This flange portion 103 has an external annular groove 104 in which an annular seal ring 105 made of elastomeric material such as rubber is arranged. The lower surface 106 of flange portion 103 provides a shoulder against which one end of a helical compression spring 108 bears. The other and lower end of this spring bears against a spider-like retainer 109. The outer ends of the arms of this retainer 109 grip wall surface 99 and prevent expulsion of the retainer. Spring 108 serves to bias piston member 100 upwardly.

Figure 9:
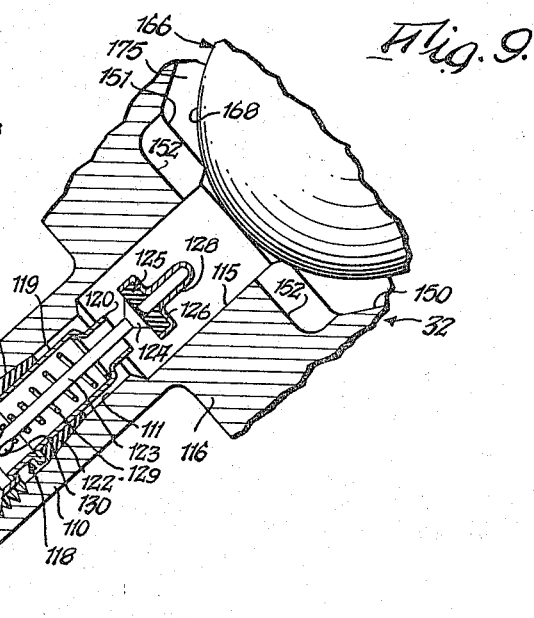
FIG. 9 is a still further enlarged fragmentary sectional view of the pressure regulator means to reveal the construction of its valve means and taken on line 9—9 of FIG. 2.

The side wall 101 of piston member 100 embraces in spaced relation thereto a downwardly extending tubular part 110 formed as an integral part of inner handle part 81. As best shown in FIG. 9, tubular part 110 is provided with a bore of varying diameter including a narrow cylindrical portion 111 on the lower side of which is provided a frusto-conical section 112. The larger end of this section 112 is remote from section 111 and continues as a cylindrical portion 113 the outer end portion of which is internally threaded as indicated at 114. On the side of the narrow bore section 111 opposite from the frusto-conical section 112 the bore is enlarged to provide a section 115 which extends upwardly through an integral transverse wall 116 provided across the tubular lower handle part 81.

Arranged in bore sections 111–115 is a valve assembly represented generally by the numeral 118. This valve assembly is a conventional form of tire valve used with pneumatic tires for vehicles. This vlave assembly 118 may be of a type sold under such trademarks such as Bridgeport, Dill or Schroeder. As shown, the valve assembly 118 comprises a valve core body or barrel 119 which at one end forms an annular valve seat 120 and at its other end is suitably connected to a swivel plug 121. This plug 121 is tubular and externally threaded to screw into the internal threads 114. Barrel 119 intermediate its ends is shown as crimped upon itself to provide an annular shoulder against which an annular gasket 122 may be arranged. The periphery of this gasket 122 is tapered and adapted to sealingly engage tapered bore section 112 when plug 121 is screwed into position.

Slidably arranged within the elements 119 and 121 of the valve assembly 118 is a rod or stem 123. Adjacent one end thereof this valve rod or stem is provided with an enlargement 124 against which a valve gasket 125 bears, this gasket being held in a cup 126 having a neck portion 128 which closely embraces valve stem 123. Surrounding the intermediate portion of valve stem 128 is a spiral compression spring 129. The large end of this spring bears against a contracted portion of the valve core barrel 119, this being the end adjacent valve seat 120. The other and narrow end of this valve spring bears against a pair of abutments 130, 130 on stem 123 and formed by upsetting the metal thereof. In this manner, spring 129 constantly urges valve gasket 125 toward engagement with its seat 120. In FIGS. 2 and 9 the valve gasket is shown in an unseated condition.

Valve stem 123 at the end remote from valve gasket 125 extends beyond the end 131 of tubular part 110 which is the downstream end. The extremity of this projecting portion of valve stem 123 is shown as provided with an enlarged head 132. This head 132 is adapted to be engaged by end wall 102 by piston member 100.

Referring to FIG. 2, it will be seen that cylinder wall 99, the lower surface of transverse wall 116, the upper end face of piston member 100, the external surface of tubular part 110 and the valve assembly 118 downstream of valve seat 120 provide a downstream chamber represented by the numeral 133. This chamber 133 is shown as communicating with the bore 134 of a laterally extending nipple 135 formed integrally on inner handle part 81 and extending laterally outwardly therefrom. Secured to this nipple is one end of a flexible hose 136 having an internal passage 137 which may be made of any suitable material such as plastic.

As shown in FIG. 5, the other end of this hose 136 is secured to the outer end of a nipple 138. This nipple has a bore 139 extending completely therethrough. At its inner end this nipple is shown as externally enlarged as indicated at 140 to provide a head which can be press-fitted into the outer counter-bored portion 141 of recess 70, the step between the inner and outer portions of this recess providing an outwardly facing shoulder 142.

Check valve means are shown as provided in the communicating passages 70 and 139. The preferred check valve construction as shown comprises a member indicated generally by the numeral 143 made of a suitable elastomeric material. This member 143 includes a tubular intermediate portion 144 the inner end of which is extended as two flaps 145, 145, the free ends of which form therebetween a slit 146 (FIG. 6). At its other end the tubular part 144 is integrally enlarged outwardly to provide an annular flange part 148 adapted to be clamped between shoulder 142 and the inner end face of nipple 138.

In FIG. 6, the flaps 145 are shown as clamped together so as to sealingly close slit 146, this being occasioned by pressure in recess 70 being higher than pressure inside nipple 138. However, when pressure in nipple bore 139 is higher than that in recess 70 the flaps will separate as depicted in FIG. 7 to provide a flow passage indicated at 149 which establishes communication between this bore and recess.

Adverting again to inner handle part 81, the outer end portion thereof extends outwardly from transverse wall 116 so as to provide a recess 150. The inner end of this recess has an end wall 151 which is the upper end face of transverse wall 116 and bore portion 115 extends to this surface. This end face 151 forms a shoulder which is annular in form and shown as having a pair of diametrically opposed grooves 152, 152. These grooves establish communication at all times between recess 150 and bore section 115.

The extreme upper end portion of handle part 81 is shown as provided with external threads 153. At the base of these threads the handle part is provided with an annular external groove 154 in which an annular seal ring 155 of elastomeric material such as rubber is arranged.

The handle 32 also includes an outer part 156. This part is of inverted cup-shaped form having a side wall 158 and a closed end wall 159. Internally, the outer handle part 156 has a cavity 160 including an upper section 161 of reduced cylindrical configuration, the base of this section being indicated at 162. Cavity 160 also has an intermediate portion 163 and a lower portion adjacent the lower open end of the upper handle part which is internally threaded as indicated at 164 and below or outwardly of this threaded section is an internal smooth cylindrical wall surface 165. When the two handle parts 81 and 156 are joined together, the threaded sections 153 and 156 screw on each other with the cylindrical internal surface 165 slidingly and sealingly engaging the seal ring 155.

The recess 150 and cavity 160 jointly provide a chamber for housing a cartridge or metal bottle of carbon dioxide represented generally by the numeral 166. This cartridge 166 is of conventional construction and is shown as having a hemispherical bottom portion 168 seated on shoulder 151, and also includes an intermediate cylindrical portion 169 which narrows down at its upper end to provide a terminal neck portion 170. The mouth of this neck is closed by a plug or closure member indicated at 71 having an end wall 172.

The cartridge neck 170 is substantially entirely accommodated in the upper cavity section 161 but there is clearance surrounding this neck as indicated at 173. There is also clearance existing around intermediate cylindrical section 169 of the cartridge and the surrounding cavity wall 163, such clearance being indicated at 174. Likewise, there is clearance between the bottom portion 168 of the cartridge and the surrounding wall of recess 150 as indicated at 175. The grooves 152 are in constant communication with the connected clearances 173-175.

Puncture means are provided for piercing the closure wall 172 of the carbon dioxide cartridge 166. The construction of such means and their mode of operation are best understood by referring to FIGS. 10-12. End wall 159 of outer handle part 156 is shown as provided with a cylindrical recess 176 opening to internal end face 162. This recess is adapted to receive and its side wall be engraved by the knurled periphery 178 of the cylindrical base 179 of a piercing pin member represented generally by the numeral 180. This piercing pin member 180 also includes a projecting pin portion 181 having a blunt outer end 182, a flat side 183 and a tapered external surface 184 adjacent its outer end.

By reason of the knurling 178 the pin member 180 cannot rotate relative to end wall 159 after it has been pressed into position as shown in all the figures where this member is illustrated, such as in FIGS. 2 and 10-12.

Figure 10:
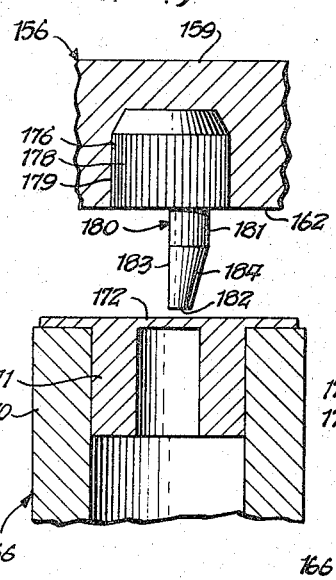
FIGS. 10, 11 and 12 are enlarged fragmentary views depicting the sequence of puncturing the closure wall of a carbon dioxide cartridge.
Figure 11:
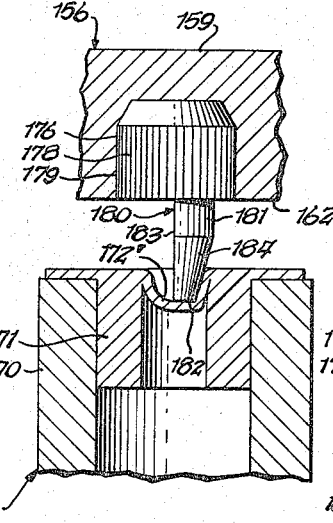
Figure 12:
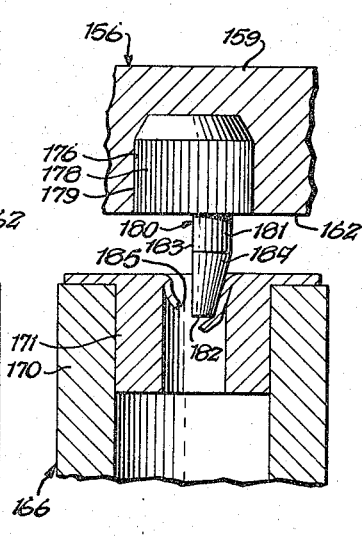

Assuming that the outer handle part 156 has been removed from the inner handle part 81, by unscrewing the threads 153 and 164, a fresh cartridge 166 is placed in its position with its bottom 168 on shoulder 151. Thereafter, outer handle part 156 is placed over the cartridge much in the manner of a cap and turned relative to inner handle part 81 so as to engage the threads 153 and 164. Turning of the handle parts relative to each other, so as to draw end wall 159 toward transverse wall 116, will cause the blunt end 182 of piercing pin member 180 to approach the outer end face of closure wall 172 on the upper end of the cartridge, as depicted in FIG. 10. Continued turn-down of outer handle part 156 will force the blunt end 182 of the piercing pin member 180 to engage this closure wall 172 and distort it, as depicted in FIG. 1, where the wall 172 has been dented inwardly as indicated at 172' but without rupture of this wall yet. Still further downward movement of the upper handle part will cause the distorted closure wall 172' to rupture and tear providing an enlarged opening 185 as depicted in FIG. 12. This opening 185 allows for the free egress of carbon dioxide fluid within the cartridge 166.

*Operation*

When the dispensing apparatus is sold it is generally packaged in a condition where the valve body member 30 is already mounted on plate 28, as previously explained, and the handle is pivoted down to position 32b closely adjacent mounting plate 28 and the tube 64 is unmounted on valve body member 30. When the apparatus is to be used, the tube 64 is manually press-fitted into bore portion 61 of the valve body member. In this connection, since both ends of the tube 64 are the same, it matters not which end is inserted into the valve body member. Insertion is continued until the knife edge 69 bottoms on shoulder 63. Beveled edge 68 facilitates insertion.

Following this and with handle in position 32b or 32a, the lower end of tube 64 is placed against the center of top wall 25 of bung 22 and pressed downwardly so as to penetrate this wall, the knife edge 69 facilitating this. Downward movement of the tube 64 with the valve body member 30 mounted thereon is continued so as to cause the lower end of inner part 50 of this member to also penetrate the bung top wall. In so penetrating this wall, the elastomeric material such as rubber of which the bung is composed yields to accommodate the part 50 but closely grips the periphery thereof.

About this time the lugs 38 on one end of mounting plate 28 are hooked under can flange 19 and using this hooked engagement as a fulcrum, the other end of the plate having the handle 40 is pressed downwardly over the diametrically opposite portion of the can so as to snappingly hook the lug 41 also under can flange 19. As this final placement occurs, the lower end face 58 of the outer imperforate part 49 of the valve body member 30 is pressed forcefully against the top surface of bung 22. It will be appreciated that the internal pressure within can 15 tends to bulge its top wall 18 upwardly and this adds to the firmness of the pressing engagement between the bung 22 and the body part 49, the bung acting as a gasket.

When the dispensing device was mounted as so far described, the handle was either in the position 32b or 32a in both of which positions the communication between valve chamber inlet 60 and outlet 78 was blocked, as depicted in FIG. 8. With the mounting plate 28 now in attached position on the can, outer handle part 156 is unscrewed and a fresh, unpunctured cartridge 166 of carbon dioxide is placed in recess 150 and the outer handle part reattached as previously described. As the outer handle part is screwed down on inner handle part 81 the cartridge will be punctured releasing the pressurized carbon dioxide confined within the cartridge. The released carbon dioxide flows through opening 185 in the mouth of the cartridge and through the connected passages 173–175, 152 and 115 to the valve assembly 118.

At this time it is pointed out that the position of piston member 100 is determined by the balance between the force produced by the regulated pressure in downstream chamber 133 and the force exerted by spring 108. It will be seen that if the spring force predominates over the opposing fluid force, the piston member will move upwardly so that its end wall 102 engaging the head 132 on valve stem 123 will lift valve gasket 125 off its seat 120 or farther away from its seat if the valve gasket is already unseated. This opening of the pressure regulating valve allows some relatively high pressure carbon dioxide to flow through the restricted passage provided by the spacing between the opposing surfaces of valve seat 120 and gasket 125. In flowing through this restricted passage a pressure drop is produced in the carbon dioxide but the effect will be to tend to raise or maintain the pressure of gas in downstream chamber 133. As this pressure elevates the force balance obtaining between the fluid and spring effects will be upset causing the piston member 100 to reposition itself with the end wall 102 moving farther away from the valve assembly 108 until a new force balance is achieved.

The pressure regulator 32 is preset so that it will maintain a pressure of 10 to 12 pounds per square inch on the beer in the can at 38° F., and this it does, it will be noted, regardless of the amount of beer withdrawn from the can. One cartridge 166 services one can 15.

The carbon dioxide in downstream chamber 133 which has had its pressure regulated as just described is transmitted via connected passages 134, 137, 139, 149, 70, 71, 56 and 72 to the interior of the can 15 immediately adjacent the top thereof. This will pressurize the beer in the can. If for any reason the beer should foam and tend to develop an excessive pressure which tends to back up through the slot 72, annular space 56 and connected passages 71 and 70, the check valve 143 will close to prevent this, as depicted in FIG. 6. However, whenever the pressure is higher on the upstream side or the pressure regulator side of the check valve 143 than on the downstream side thereof this check valve will open to allow carbon dioxide to flow toward the can 15, as depicted in FIG. 7.

The can of beer with the dispensing apparatus now mounted thereon and operatively charged with carbon dioxide is ready for use. When it is desired to draw off some beer, the handle 32 is moved from either the position 32a or 32b into the full line position shown in FIG. 1 and also fragmentarily shown in FIG. 3, where a part of the inner handle part abuts against the top of the spout 79 as indicated at 186. In such position the groove 76 in the flow control valve member 31 is positioned so as to establish maximum communication between inlet and outlet ports 60 and 78 without any overlap or underlap with respect to either port. It is desired to avoid such underlap or overlap to prevent eddy currents in the beer as its flows through connected passages 60, 76 and 78 which experience has shown tends to foam the beer undesirably.

When it is desired to stop the flow of beer from the spout 79, handle 32 is moved to a substantially upright position preferably to the position 32a which, as shown in FIG. 8, will cause groove 76 in valve member 31 to establish communication between spout bore 78 and vent hole 74, thereby breaking any vacuum that might otherwise tend to form in the spout tending to hold up a quantity of beer therein which could result in undesirable dripping. In other words, by venting the internal spout when the flow control valve is shut off dripping at the tip of the spout is prevented.

The handle 32 may be swung down to the substantially horizontal position 32b so that the overall height of the can 15 with the dispensing apparatus mounted thereon is reduced for storage, say on the shelf of a household refrigerator.

One of the important features of the invention is the upright position of the carbon dioxide cartridge 166 within the hollow handle. This is of significance in that a fresh cartridge may contain carbon dioxide in a liquid state. If the cartridge were inverted with the neck down, this liquid carbon dioxide could run out of the bottle and freeze up the regulating valve assembly. In other words, the free end of the handle is above the bottom of the cartridge and the pierced end of this cartridge is above any liquid level therein. As a consequence, only gaseous carbon dioxide will pass through puncture opening 185. The gas so discharged from the cartridge produces a throttling effect and hence a cooling effect which draws heat from the handle and since carbon dioxide gas must flow downwardly through the connected clearance 173–175 toward the regulator valve assembly 118, the gas is heated somewhat so that it will be at a somewhat expanded condition before flowing through the regulator valve. Thus, the disposition of the punctured cartridge is such that the carbon dioxide flowing from the cartridge is caused to adjust in pressure before presenting itself to the regulator valve assembly 118.

Another feature of the invention is that should the regulated pressure of carbon dioxide in chamber 133 rise to a predetermined excessive level, the piston member 100 will pass a vent hole 188 provided in the side wall of the inner handle part 81, such vent hole leading to the atmosphere. Thus, seal ring 105 will pass over vent hole 188 so as to place the same in communication with downstream chamber 133 and thereby relieve excessive pressure in this chamber. In this connection, it has been found that it is essential that the area of the vent hole 188 should not be more than 1½ times the cross-sectional area of seal ring 105. If it exceeds this limit the O-ring will tend to be drawn into the vent hole and form a pimple so-to-speak, thereby hanging up the piston member and preventing venting of the downstream chamber 133. Staying below the area ratio mentioned avoids this.

Another important feature of the invention is that the connected passages through which the beer flows from the can interior to the tip of the spout 79 is made up of three stages each of which produces a drop in pressure as the beer flows therethrough so that when the beer is finally discharged from the spout, it will have a gentle flow, being at a pressure of only about ½ pound per square inch. Also, the transverse or cross-sectional area of the initial flow passage for the beer in its withdrawal from the can, being the bore of tube 64, must have a diameter in the range of from 0.080 to 0.125 inch so that the discharge rate of the beer will be about 1 oz. per second. Thus, for an 8 to 12 oz. glass being filled it will take 8 to 12 seconds to fill the same. If the flow rate is too high, it is difficult to turn the flow control valve on and off in a very short time. Accordingly, it is most important to adjust the pressure and velocity of the beer as it flows from the can to the spout tip.

Adverting to the three pressure dropping stages, the first stage comprises the bore 65 of tube 64 and bore section 60 of the valve body member 30, the second stage comprises the groove 76 in valve member 31, and the third stage comprises the bore 78 of spout 79. Bore 60 is slightly larger than bore 65, groove 76 is larger than bore 60, and bore 78 is larger than bore 76.

FIG. 14

Figure 14:
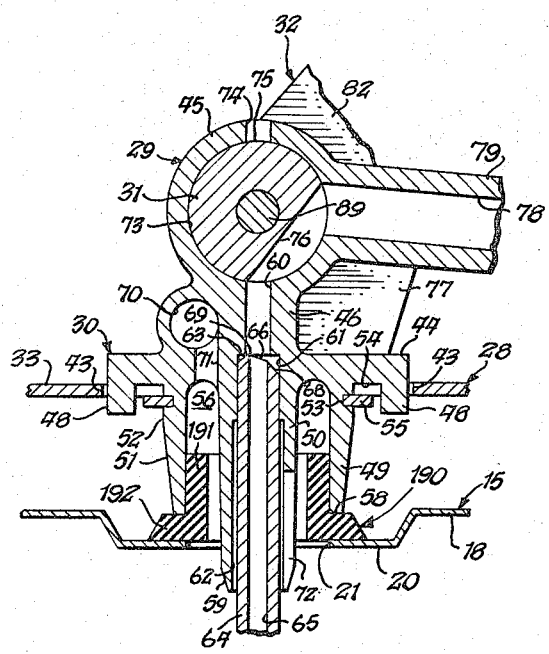
FIG. 14 is a sectional view similar to FIG. 3 and showing a modified manner of mounting sealingly the body of the beverage flow control valve means on the top wall of the can.

FIG. 14 is similar to FIG. 3 except that FIG. 14 illustrates a different mode of sealingly mounting the valve body member 30 on the can top wall 18. The arrangement shown in FIG. 14 is intended for that type of can which may be purveyed with a removable and non-puncturable bung. This necessitates placing a gasket between outer body part 49 and the upper surface of the recessed wall portion 20 of the can. Such a gasket is represented in FIG. 14 by the numeral 190. This gasket includes a sleeve portion 191 which fits internally and intimately engages the internal surface of outer part 49 of the valve body member, and also an out-turned annular flange portion 192 which is clamped between the lower end face 58 of the part 49 and the upper surface of can wall portion 20. Otherwise the apparatus is the same as previously described in connection with FIGS. 1–13 and the same as previously described in connection with FIGS. 1–13 and the same reference numerals have therefore been employed.

From the foregoing, it will be seen that the embodiments illustrated and described hereinabove accomplish the objects stated. Since changes in construction may occur to those skilled in the art without departing from the spirit of the invention, the scope of the invention is to be measured by the appended claims:

What is claimed is:

1. In a beverage dispensing apparatus, the combination comprising a handle pivotal about an axis and including an inner part adjacent said axis and having a recess in its outer end and an outer cup-shaped part removably joined to said outer end and having a cavity, said cavity forming jointly with said recess a chamber, pressure regulator means housed within said inner part for controlling the pressurization of a dispetnsable beverage and having an inlet, a container of pressurized fluid arranged in said chamber and having a bottom portion arranged in said recess and also having a top portion arranged in said cavity, said top portion including a puncturable end wall, puncture means for piercing said end wall and carried by said outer part, passage means establishing communication between said end wall and said regulator inlet, said container when punctured supplying pressurized fluid via said passage means to said regulator inlet, and beverage dispensing flow control valve means operated by said handle and shut off when said handle is substantially upright and open when said handle is tipped downwardly to a position above horizontal.

2. In a beverage dispensing apparatus, the combination comprising a handle pivotal about an axis and including an inner part adjacent said axis and having a recess in its outer end and an outer cup-shaped part removably joined to said outer end and having an end wall and a cavity, said cavity forming jointly with said recess a chamber, pressure regulator means housed within said inner part for controlling the pressurization of a dispensable beverage and having an inlet, a cartridge arranged in a said chamber and containing pressurized carbon dioxide some of which initially at least may be in a liquid state within said cartridge, said cartridge including a bottom portion arranged in said recess and a top portion arranged in said cavity, said top portion including a puncturable closure wall opposing said end wall, puncture means for piercing said closure wall and mounted on said end wall, passage means establishing communication between said closure wall and said regulator inlet, said cartridge when punctured supplying pressurized fluid via said passage means to said regulator inlet, and beverage dispensing flow control valve means operated by said handle and shut off when said handle is in a substantially upright position and open when said handle is tipped downwardly to a position above horizontal, whereby any liquid carbon dioxide in said cartridge is prevented from draining therefrom through its punctured closure wall.

3. In a beverage dispensing apparatus, means for controlling the pressurization of a dispensable beverage and comprising a pivotal handle including an inner tubular part and an outer cup-shaped part removably joined to the outer end of said inner part, said inner part having a bore terminating at its outer end in an outwardly facing shoulder and having at its inner end an enlarged cylindrical wall surface, a valve assembly mounted in a said bore and including a valve stem projecting beyond said inner end of said bore, piston means slidable on said surface and adapted to engage said stem, spring means urging said piston means toward said stem, a container of pressurized fluid seated on said shoulder and partially arranged in said outer part, puncture means for piercing said container to release fluid for communication with said bore, and means establishing communication between the exterior of said container and said bore for passing fluid by said shoulder when said container is seated thereon and said container is punctured, the position of said stem being determined by the spring induced and fluid induced force balance on said piston means.

4. In a beverage dispensing apparatus, means for controlling the pressurization of a dispensable beverage and comprising body means including a tubular part, a valve seat on said body means, a movable valve biased toward said seat and having a valve stem projecting from said part, cylinder means surrounding said part, piston means slidably arranged in said cylinder means and including a cup-shaped member having a tubular portion and an end wall portion, said tubular portion surrounding said part, said end wall portion being adapted to engage said stem, and spring means urging said member toward said stem.

5. Apparatus according to claim 4 wherein said tubular portion is spaced from said part, and said cylinder means is provided with a vent hole arranged in such location that when said member has moved a predetermined amount away from said stem said hole communicates with the space between said tubular portion and said part.

6. In a beverage dispensing apparatus, means for controlling the pressurization of a dispensable beverage and comprising body means including a tubular part, a valve assembly mounted in said part and including a seat and a movable valve biased toward said seat and having a valve stem projecting from said part, cylinder means surrounding said part, piston means slidably arranged in said cylinder means and including a cup-shaped member having a tubular portion and an end wall portion, said tubular portion surrounding said part in spaced relation thereto, said end wall portion being adapted to engage said stem, and spring means urging said member toward said stem.

7. In a beverage dispensing apparatus, means for controlling the pressurization of a dispensable beverage and comprising body means including a tubular part having upstream and downstream ends, a removable valve assembly mounted in said part and including a seat facing upstream and a movable valve biased toward said seat and having a valve stem projecting beyond said downstream end, cylinder means surrounding said part, cup-shaped piston means slidable on said cylinder means and receiving said part and having an end face communicating with said part and adapted to engage said stem, and spring means urging said piston means toward said stem, the pressure of fluid against said end face working in opposition to said spring means.

8. In a beverage dispensing apparatus means for controlling the pressurization of a dispensable beverage and comprising body means including a tubular part, a valve seat on said body means, a movable valve biased toward said seat and having a valve stem projecting from said part, cylinder means surrounding said part, piston means slidably arranged in said cylinder and including a cup-shaped member having a tubular portion closed at one end by an end wall portion and having an outwardly extending annular flange portion at its other end providing a shoulder which faces toward said end wall portion, said tubular portion surrounding said part, said end wall portion being adapted to engage said stem, and a helical compression spring surrounding said tubular portion and at one end engaging said shoulder for urging said member toward said stem.

9. Apparatus according to claim 8 wherein said tubular portion is spaced from said part, said flange portion carries an annular seal ring of elastomeric material slidably engaging said cylinder means, and said cylinder means is provided with a vent hole arranged in such location that when said end wall portion has moved a predetermined distance away from said stem said hole communicates with the space between said tubular portion and said part, said hole having an area not greater than 1½ times the cross-sectional area of said ring.

10. In beverage dispensing apparatus, the combination comprising a mounting plate having a hole therethrough, beverage flow control valve means including a body member having a shoulder engaging one side of said plate adjacent said hole and also having a portion extending through said hole, said portion having an annular groove adjacent the other side of said plate and an externally tapered end the narrow extremity of which is remote from said groove, and a split retaining ring arranged in said groove and having a portion opposing said other side of said plate, said ring having been adapted to be forced over said tapered end toward said groove.

11. In beverage dispensing apparatus for a container including a wall having a hole therethrough, the combination comprising beverage flow control valve means including body means having an inner member extending through said hole into said container, an outer annular member surrounding and spaced from said inner member and of shorter length to provide an end face and a beverage withdrawal tube surrounded by and of greater length than said inner member, a seal member of elastomeric material covering said hole and having an outer portion clamped between said wall and end face and an inner portion punctured and penetrated by both said tube and inner member, and means for supplying pressurized fluid to said container through the space between said inner and outer members.

12. In beverage dispensing apparatus for a container including a wall having a hole therethrough, the combination comprising beverage flow control valve means including body means having a slotted inner member extending through said hole, into said container and an outer imperforate annular member surrounding and spaced from and of shorter length than said inner member to provide an annular space communicating with the slot in said inner member, said outer member having an end face, a seal member of elastomeric material covering said hole and having an outer portion clamped between said wall and end face and an inner portion punctured and penetrated by said inner member, said slot extending beyond opposite sides of said inner portion, and pressure regulating means for supplying pressure regulated fluid to said space.

13. In beverage dispensing apparatus, the combination comprising beverage flow control valve means including a valve rotor, a handle secured to said rotor for moving the same and including threadedly connected inner and outer parts jointly providing a chamber having an end wall, a container of pressurized fluid arranged in said chamber and having a closure wall opposing said end wall, and a piercing pin carried by said end wall and penetrating said closure wall and having a blunt end and a periphery including a flat side portion and a frusto-conical side portion.

14. In apparatus for dispensing beer, the combination comprising a valve body having an inlet passage, an outlet passage and a valve rotor chamber therebetween, a selectively positionable valve rotor arranged in said chamber and having a rotor passage which in a selected position of said rotor establishes communication between said inlet and outlet passages, and an inlet tube mounted on said body and having an internal cylindrical passage communicating with said inlet passage, the diameter of said tube passage falling in the range of from 0.080 to 0.125 inch, the cross-sectional area of said inlet passage being greater than that of said tube passage, the cross-sectional area of said rotor passage being greater than that of said inlet passage when said rotor is in its said selected position, the cross-sectional area of said outlet passage being greater than that of said rotor passage, said areas being determined transverse to the direction of flow respectively therethrough, said passages successively producing a pressure drop in the fluid flowing therethrough.

References Cited
UNITED STATES PATENTS

| | | | |
|---|---|---|---|
| 551,778 | 12/1895 | Mason | 137—505.42 |
| 610,127 | 7/1898 | Durafort | 222—5 X |
| 911,225 | 2/1909 | Flach et al. | 222—400.7 |
| 1,318,863 | 10/1919 | Gradolph | 222—396 |
| 1,361,636 | 12/1920 | Stage | 137—116.3 |
| 1,742,323 | 1/1930 | Slagel | 137—505.42 X |
| 2,032,095 | 2/1936 | O'Leary | 222—400.7 X |
| 2,049,851 | 8/1936 | Madan | 222—396 |
| 2,061,642 | 11/1936 | Williamson | 222—396 |
| 2,120,297 | 6/1938 | Reinecke | 222—400.7 X |
| 2,158,347 | 5/1939 | Yirava | 222—82 X |
| 2,492,309 | 12/1949 | Miller | 222—82 X |
| 2,504,009 | 4/1950 | De Phillips et al. | 222—400.7 X |
| 2,601,938 | 7/1952 | Alexander | 222—5 |
| 2,615,287 | 10/1952 | Senesky | 137—505.42 |
| 2,822,002 | 2/1958 | Mack | 222—399 X |
| 2,884,941 | 5/1959 | Wallace | 137—116.3 |
| 3,026,006 | 3/1962 | Frankfurt | 222—400.7 |
| 3,039,661 | 6/1962 | Wentz et al. | 222—396 |
| 3,216,445 | 11/1965 | Cornelius | 137—594 |
| 3,228,564 | 1/1966 | Olson | 222—82 |

WALTER SOBIN, *Primary Examiner.*